(12) United States Patent
Lin et al.

(10) Patent No.: US 11,137,440 B2
(45) Date of Patent: Oct. 5, 2021

(54) SELF-HEATING EFFECT APPARATUS AND TEST METHOD

(71) Applicants: Semiconductor Manufacturing International (Shanghai) Corporation, Shanghai (CN); Semiconductor Manufacturing International (Beijing) Corporation, Beijing (CN)

(72) Inventors: Xi Lin, Shanghai (CN); Yi Hua Shen, Shanghai (CN); Sen Sheng Li, Shanghai (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 837 days.

(21) Appl. No.: 15/853,131

(22) Filed: Dec. 22, 2017

(65) Prior Publication Data
US 2018/0180664 A1 Jun. 28, 2018

(30) Foreign Application Priority Data
Dec. 23, 2016 (CN) .......................... 201611207623.1

(51) Int. Cl.
*G01R 31/28* (2006.01)
*G06F 30/20* (2020.01)
(Continued)

(52) U.S. Cl.
CPC ..... *G01R 31/2848* (2013.01); *G01R 31/2849* (2013.01); *G01R 31/2874* (2013.01);
(Continued)

(58) Field of Classification Search
CPC ............ G01R 31/2848; G01R 31/2874; G01R 31/2849; G01R 31/00; G06F 30/20; G06F 30/30; G06F 2119/08; G09B 25/00
See application file for complete search history.

(56) References Cited

U.S. PATENT DOCUMENTS

2015/0370937 A1    12/2015 Liu et al.
2016/0048622 A1*    2/2016 Jeon ..................... G06F 30/367
                                                      703/14
(Continued)

OTHER PUBLICATIONS

The European Patent Office (EPO) The Extended European Search Report for 17207628.3 dated Apr. 26, 2018 11 Pages.

*Primary Examiner* — Nha T Nguyen
(74) *Attorney, Agent, or Firm* — Anova Law Group, PLLC

(57) ABSTRACT

A self-heating effect apparatus includes a memory and a processor. The processor is coupled to the memory and configured to process a self-heating effect model for characterizing a heat flow network of devices. The devices include a device under test and one or more adjacent devices surrounding the device under test. The self-heating effect model includes a reference thermal resistance and a reference thermal capacity; a thermal temperature feedback model used to acquire a thermal level of the device under test; a thermal resistance modification model used to acquire a modified thermal resistance of the device under test according to the thermal level of the device under test and the reference thermal resistance; and a thermal capacity modification model used to acquire a modified thermal capacity of the device under test according to the thermal level of the device under test and the reference thermal capacity.

20 Claims, 6 Drawing Sheets

(51) Int. Cl.
*G06F 30/30* (2020.01)
*G06F 119/08* (2020.01)

(52) U.S. Cl.
CPC .............. *G06F 30/20* (2020.01); *G06F 30/30* (2020.01); *G06F 2119/08* (2020.01)

(56) References Cited

U.S. PATENT DOCUMENTS

| | | | |
|---|---|---|---|
| 2016/0125106 A1* | 5/2016 | Sukharev | G06F 30/39 716/136 |
| 2016/0203246 A1* | 7/2016 | Chiou | G06F 30/20 716/136 |
| 2016/0357898 A1 | 12/2016 | Johnson et al. | |

* cited by examiner

SELF-HEATING EFFECT APPARATUS AND TEST METHOD

CROSS-REFERENCES TO RELATED APPLICATIONS

This application claims priority of Chinese Patent Application No. 201611207623.1, filed on Dec. 23, 2016, the entire contents of which are hereby incorporated by reference.

FIELD OF THE INVENTION

The present disclosure generally relates to the field of device test simulation and, more particularly, relates to a self-heating effect apparatus and a test method.

BACKGROUND

Device self-heating effect refers to that, the heat generated by the device itself during operation is large enough to cause the temperature inside the device to be higher than the ambient temperature, thereby influencing the performance of the device. Thus, the device self-heating effect is studied by simulation.

A self-heating effect model is used to simulate the heat flow network of the device self-heating effect. However, conventional self-heating effect model cannot accurately simulate the heat flow network of the device self-heating effect.

BRIEF SUMMARY OF THE DISCLOSURE

One aspect of the present disclosure provides a self-heating effect apparatus. The self-heating effect apparatus includes a memory and a processor. The memory is configured to store program instructions for a self-heating effect model. The processor is coupled to the memory and, when executing the program instructions, configured to process the self-heating effect model for characterizing a heat flow network of devices. The devices include a device under test and one or more adjacent devices surrounding the device under test. The self-heating effect model includes a reference thermal resistance and a reference thermal capacity, a thermal temperature feedback model, a thermal resistance modification model, and a thermal capacity modification model. The thermal temperature feedback model is used to acquire a thermal level of the device under test, by thermal levels of the one or more adjacent devices, distance levels between the device under test and the one or more adjacent devices, a vertical thermal diffusion level of the device under test, a power level of the device under test, and an ambient temperature level of the device under test and the one or more adjacent devices. The thermal resistance modification model is used to acquire a modified thermal resistance of the device under test according to the thermal level of the device under test and the reference thermal resistance. The thermal capacity modification model is used to acquire a modified thermal capacity of the device under test according to the thermal level of the device under test and the reference thermal capacity.

Another aspect of the present disclosure provides a test method. The test method includes providing devices including a device under test and one or more adjacent devices surrounding the device under test; and providing a self-heating effect apparatus. The self-heating effect apparatus includes a memory and a processor. The memory is configured to store program instructions for a self-heating effect model. The processor is coupled to the memory and, when executing the program instructions, configured to process the self-heating effect model for characterizing a heat flow network of devices. The devices include a device under test and one or more adjacent devices surrounding the device under test. The self-heating effect model includes a reference thermal resistance and a reference thermal capacity, a thermal temperature feedback model, a thermal resistance modification model, and a thermal capacity modification model. The thermal temperature feedback model is used to acquire a thermal level of the device under test, by thermal levels of the one or more adjacent devices, distance levels between the device under test and the one or more adjacent devices, a vertical thermal diffusion level of the device under test, a power level of the device under test, and an ambient temperature level of the device under test and the one or more adjacent devices. The thermal resistance modification model is used to acquire a modified thermal resistance of the device under test according to the thermal level of the device under test and the reference thermal resistance. The thermal capacity modification model is used to acquire a modified thermal capacity of the device under test according to the thermal level of the device under test and the reference thermal capacity. The test method further includes acquiring a thermal level of the device under test, by inputting the thermal levels of the one or more adjacent devices, the distance levels between the device under test and the one or more adjacent devices, the vertical thermal diffusion level of the device under test, the power level of the device under test, and the ambient temperature level of the device under test and the one or more adjacent devices, into the thermal temperature feedback model; acquiring the modified thermal resistance of the device under test by inputting the thermal level of the device under test and the reference thermal resistance into the thermal resistance modification model; and acquiring the modified thermal capacity of the device under test by inputting the thermal level of the device under test and the reference thermal capacity into the thermal capacity modification model.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
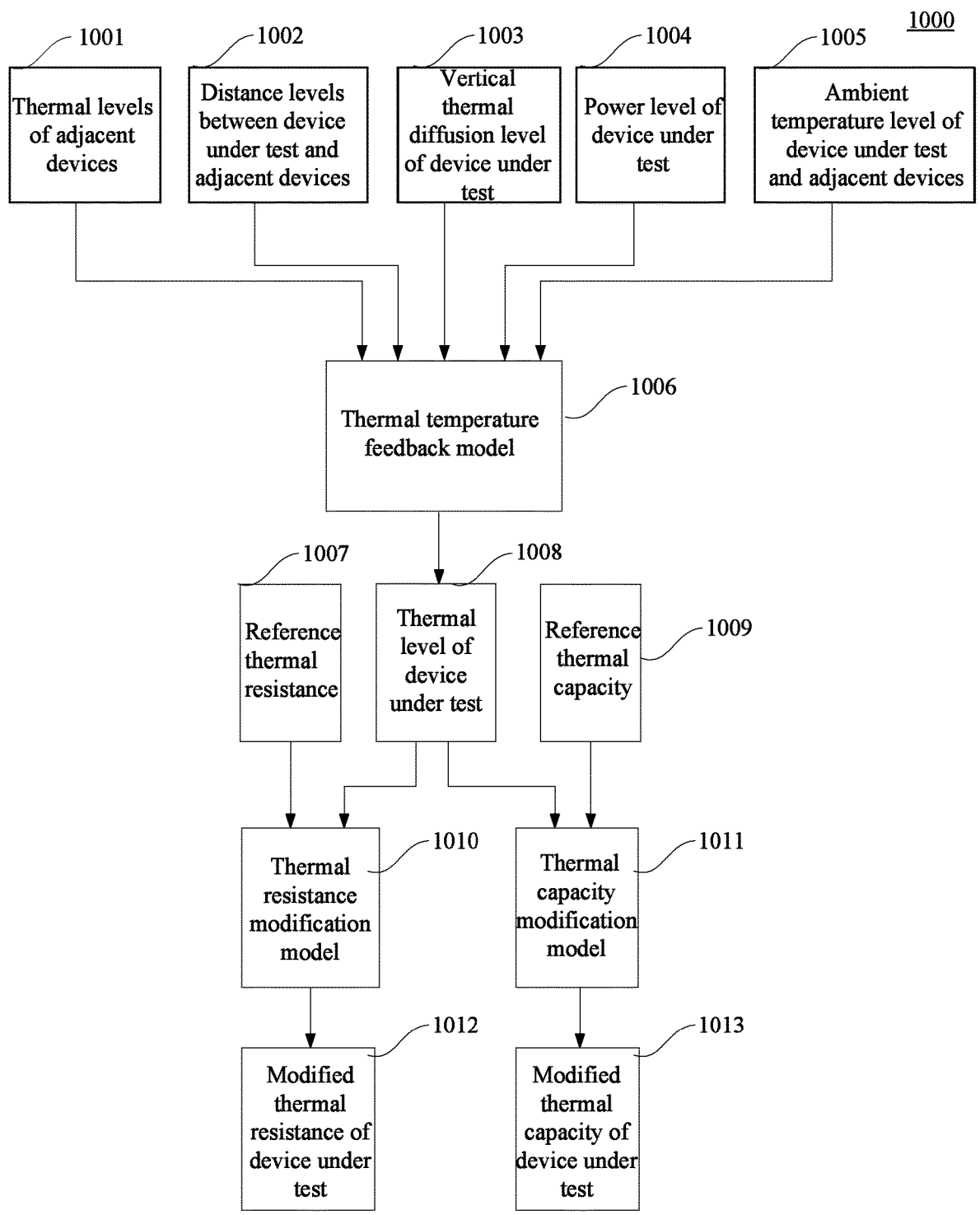
FIG. 1 illustrates a schematic diagram of an exemplary self-heating effect model consistent with various disclosed embodiments.

The aspects and features of the present disclosure can be understood by those skilled in the art through the exemplary embodiments of the present disclosure further described in detail with reference to the accompanying drawings.

A self-heating effect model may include a thermal capacity (i.e. heat capacity) and a thermal resistance having fixed values. However, conventional self-heating effect model may not accurately characterize a device heat flow network.

Because the thermal capacity and the thermal resistance may have fixed values, often, the self-heating effect model may only be used to characterize the heat flow network under a determined condition, and may not simulate the heat flow network of the device under different conditions. When the device is operating, the device may have one or more adjacent devices surrounding the device, and the device and the adjacent devices may each be in the working environment. The influence of the adjacent devices on the device, the influence of the working environment on the device, the vertical thermal diffusion of the device, and the power of the device may all have influences on the heat flow network of the device. When the conditions are changed, if the heat flow network of the device self-heating effect is still characterized by the thermal capacity and thermal resistance having the fixed values, the accuracy of simulating the heat flow network of the device self-heating effect by the thermal capacity and thermal resistance may be substantially low.

The present disclosure provides a self-heating effect apparatus including a memory and a processor. The memory is configured to store program instructions for a self-heating effect model. The processor is coupled to the memory and, when executing the program instructions, configured to process a self-heating effect model for characterizing a heat flow network of devices.

The self-heating effect model provided herein for characterizing a heat flow network of devices may include a device under test and one or more adjacent devices surrounding the device under test. The self-heating effect model may include: a reference thermal resistance and a reference thermal capacity; a thermal temperature feedback model for acquiring the thermal level of the device under test by the thermal levels of the adjacent devices, the distance levels between the device under test and the adjacent devices, the vertical thermal diffusion level of the device under test, the power level of the device under test, and the ambient temperature level of the device under test and the adjacent devices; a thermal resistance modification model used to acquire the modified thermal resistance of the device under test according to the thermal level of the device under test and the reference thermal resistance; and a thermal capacity modification model used to acquire the modified thermal capacity of the device under test according to the thermal level of the device under test and the reference thermal capacity.

The self-heating effect model may include a thermal temperature feedback model, a thermal resistance modification model and a thermal capacity modification model. The thermal temperature feedback model may take into account the influences on the thermal level of the device under test by the distance levels between the device under test and the adjacent devices, the thermal levels of the adjacent devices, the vertical thermal diffusion level of the device under test, the power level of the device under test, and the ambient temperature level of the device under test and adjacent devices. Accordingly, the thermal temperature feedback model may accurately characterize the device thermal level.

The thermal resistance modification model may be used to acquire the modified thermal resistance of the device under test according to the thermal level of the device under test and the reference thermal resistance. The thermal capacity modification model may be used to acquire the modified thermal capacity of the device under test according to the thermal level of the device under test and the reference thermal capacity. Because of the accurate characterization of the device thermal level, the thermal resistance modification model may accurately characterize the modified thermal resistance of the device under test, and the thermal capacity modification model may accurately characterize the modified thermal capacity of the device under test. Thus, the self-heating effect model may accurately characterize the heat flow network of the device under test.

FIG. 1 illustrates a schematic diagram of an exemplary self-heating effect model consistent with various disclosed embodiments. As shown in FIG. 1, the self-heating effect model 1000 may include: a reference thermal resistance 1007 and a reference thermal capacity 1009; a thermal temperature feedback model 1006 for acquiring the thermal level of the device under test 1008 by the thermal levels of the adjacent devices 1001, the distance levels between the device under test and the adjacent devices 1002, the vertical thermal diffusion level of the device under test 1003, the power level of the device under test 1004, and the ambient temperature level of the device under test and the adjacent devices 1005; a thermal resistance modification model 1010 used to acquire the modified thermal resistance of the device under test 1012 according to the thermal level of the device under test 1008 and the reference thermal resistance 1007; a thermal capacity modification model 1011 used to acquire the modified thermal capacity of the device under test 1013 according to the thermal level of the device under test 1008 and the reference thermal capacity 1009.

The self-heating effect model may be used to characterize a device heat flow network.

Figure 2:
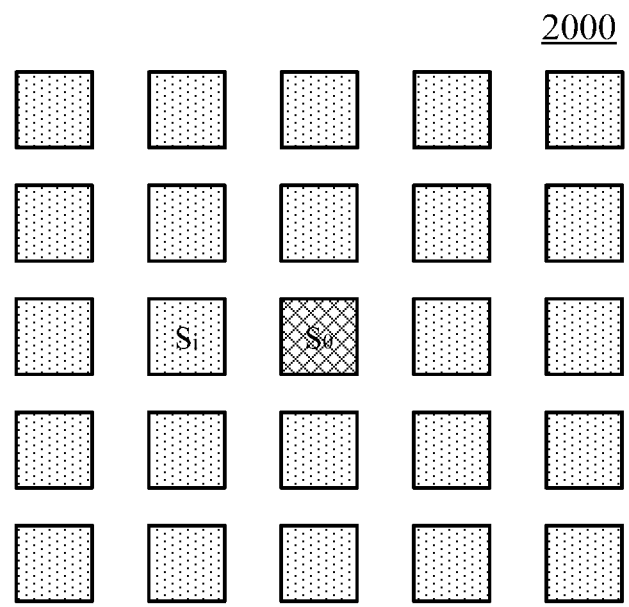
FIG. 2 illustrates a schematic view of exemplary positioning of a device under test with respect to adjacent devices consistent with various disclosed embodiments.

FIG. 2 illustrates a schematic view of exemplary positioning of a device under test with respect to adjacent devices consistent with various disclosed embodiments. As shown in FIG. 2, devices may include a device under test $S_0$ and one or more adjacent devices surrounding the device under test $S_0$.

$S_i$ may represent an i-th adjacent device.

The distance between the i-th adjacent device and the m-th adjacent device may be $L_{im}$. The distance between the i-th adjacent device and the device under test $S_0$ may be $L_{i0}$.

The distance level $W_{i0}$ between the device under test $S_0$ and the i-th adjacent device may be acquired according to the distance $L_{i0}$ between the device under test $S_0$ and the i-th adjacent device. In one embodiment, $W_{i0}=1/L_{i0}$. In another embodiment, $W_{i0}=1/L_{i0}^2$.

The distance level $W_{im}$ between the i-th adjacent device and the m-th adjacent device may be acquired according to the distance $L_{im}$ between the i-th adjacent device and the m-th adjacent device. In one embodiment, $W_{im}=1/L_{im}$. In another embodiment, $W_{im}=1/L_{im}^2$.

The distance level between the device under test $S_0$ and an adjacent device may represent the level for the value of distance between the device under test $S_0$ and the adjacent device. The distance level between the device under test and an adjacent device may be dimensionless.

The distance level between the i-th adjacent device and the m-th adjacent device may represent the level for the value of distance between the i-th adjacent device and the m-th adjacent device. The distance level between the i-th adjacent device and the m-th adjacent device may be dimensionless.

Figure 3:
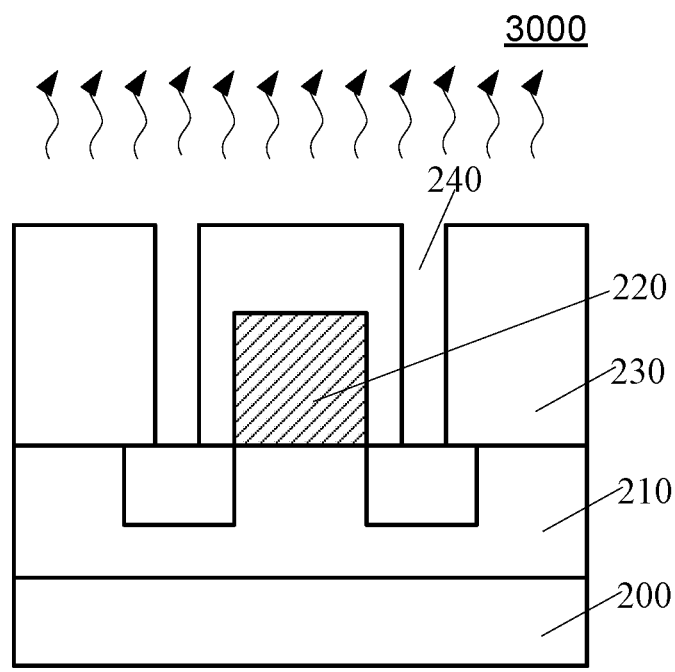
FIG. 3 illustrates a schematic view of an exemplary device under test consistent with various disclosed embodiments.

FIG. 3 illustrates a schematic diagram of an exemplary device under test consistent with various disclosed embodiments. As shown in FIG. 3, the device under test may include a base of the device under test. One or more through holes 240 of the device under test may be formed above the surface of the base of the device under test.

In various embodiments, the descriptions will be made for the device under test which may include a fin-type field effect transistor. In other embodiments, the device under test may include a planar metal-oxide-semiconductor (MOS) transistor, a diode, or a transistor.

In particular, as shown in FIG. 3, the device under test may include a base of the device under test and a body of the device under test on the base. The base of the device under test may include a semiconductor substrate 200 of the device under test, and fins 210 of the device under test on the semiconductor substrate 200 of the device under test. The body of the device under test may include: a gate structure 220 on the base, across the fin 210, covering a portion of the top surface and a portion of the side cliff surface of the fin 210; a source region of the device under test (not shown), located in the base on a first side of the gate structure 220, in particular, located in the fin 210 on the first side of the gate structure 220; a drain region of the device under test (not shown), located in the base on a second side of the gate structure 220, in particular, located in the fin 210 on the second side of the gate structure 220; an interlayer dielectric layer 230 of the device under test, covering the base of the device under test, the gate structure 220 of the device under test, the source region of the device under test, and the drain region of the device under test; one or more through holes 240 of the device under test, penetrating through the interlayer dielectric layer 230 of the device under test, and exposing the surface of the base of the device under test; a conductive plug of the device under test (not shown in FIG. 3) in the through hole 240 of the device under test.

The quantity of the through holes 240 of the device under test may be one or more. In various embodiments, examples may be shown in which the quantity of the through holes 240 of the device under test may be 2.

An i-th adjacent device may include a base of the i-th adjacent device. One or more through holes of the i-th adjacent device may be formed above the base surface of the i-th adjacent device.

The i-th adjacent device may include a base of the i-th adjacent device, and one or more through holes of the i-th adjacent device in the i-th adjacent device. For the structure of the i-th adjacent device, refer to the structure of the device under test, which will not be further described in detail.

The vertical thermal diffusion level of the device under test may represent the degree for the amount of heat which the device under test may diffuse outwardly per unit time along the direction perpendicular to the base surface of the device under test. The degree for the amount of heat diffused outwardly per unit time along the direction perpendicular to the base surface of the device under test may be related to the total exposed base area of the device under test exposed by the through holes of the device under test. Thus, in various embodiments, the vertical thermal diffusion level of the device under test may be acquired, through the total exposed base area of the device under test which is exposed by the through holes of the device under test.

The vertical thermal diffusion level of the i-th adjacent device may represent the degree for the amount of heat which the i-th adjacent device may diffuse outwardly per unit time along the direction perpendicular to the base surface of the i-th adjacent device. The degree for the amount of heat diffused outwardly per unit time along the direction perpendicular to the base surface of the i-th adjacent device may be related to the total exposed base area of the i-th adjacent device exposed by the through holes of the i-th adjacent device. Thus, in various embodiments, the vertical thermal diffusion level of the i-th adjacent device may be acquired, through the total exposed base area of the i-th adjacent device which is exposed by the through holes of the i-th adjacent device.

The vertical thermal diffusion level $VHD(S_0)$ of the device under test may be acquired according to the total exposed base area $A_0$ of the device under test exposed by the through holes of the device under test. In one embodiment, $$VHD(S_0) = \sum_{n=0}^{l} a_n A_0^n.$$

The vertical thermal diffusion level of the device under test may be dimensionless.

The vertical thermal diffusion level $VHD(S_i)$ of the i-th adjacent device may be acquired according to the total exposed base area $A_i$ of the i-th adjacent device exposed by the through holes of the i-th adjacent device. In one embodiment, $$VHD(S_i) = \sum_{n=0}^{l} a_n A_i^n.$$

The vertical thermal diffusion level of the i-th adjacent device may be dimensionless.

$l$ may be greater than or equal to 1, and $a_n$ may represent the thermal diffusion coefficient.

In various embodiments, $l$ may be equal to 2 or 3, making the operation simpler while satisfying the accuracy requirements of the vertical thermal diffusion level $VHD(S_0)$ of the device under test and the vertical thermal diffusion level $VHD(S_i)$ of the i-th adjacent device.

Figure 4:
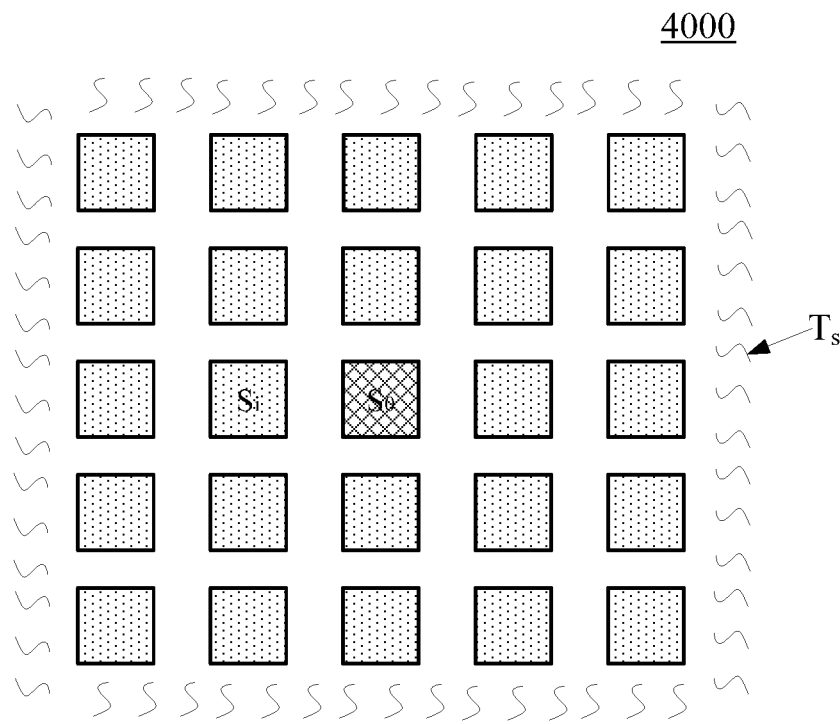
FIG. 4 illustrates a schematic view of an exemplary positioning of a device under test with respect to adjacent devices, along with their ambient environment consistent with various disclosed embodiments.

FIG. 4 illustrates a schematic view of an exemplary positioning of a device under test with respect to adjacent devices, along with their ambient environment consistent with various disclosed embodiments. As shown in FIG. 4, the ambient temperature of the device under test $S_0$ and the adjacent devices may be $T_s$.

The ambient temperature level of the device under test $S_0$ and the adjacent devices may represent the level for the magnitude of the ambient temperature at which the device under test $S_0$ and the adjacent devices may stay. The ambient temperature level of the device under test $S_0$ and the adjacent devices may be dimensionless.

The ambient temperature level ETS of the device under test $S_0$ and the adjacent devices may be acquired by the ambient temperature $T_s$ of the device under test $S_0$ and the adjacent devices. In one embodiment, $ETS=tT_s$, where t may represent an ambient temperature coefficient.

Figure 5:
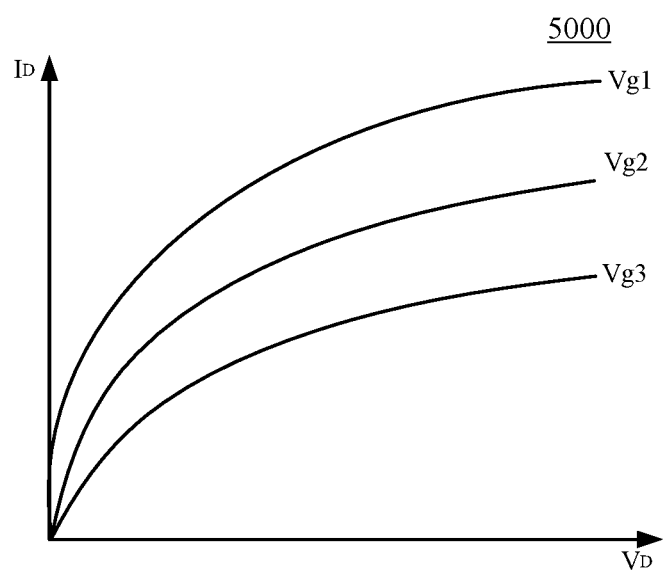
FIG. 5 illustrates a current-voltage plot of an exemplary device under test during operation consistent with various disclosed embodiments.

FIG. 5 illustrates a current-voltage plot of an exemplary device under test during operation consistent with various disclosed embodiments. As shown in FIG. 5, $V_D$ may represent the voltage difference between the source region of the device under test and the drain region of the device under test. $V_{g1}$, $V_{g2}$, and $V_{g3}$ may represent different driving voltages. $I_D$ may represent the corresponding driving current of the device under test, under the driving voltage, and the voltage difference between the source region of the device under test and the drain region of the device under test. According to the actual driving voltage applied on the device under test and the voltage difference between the source region of the device under test and the drain region of the device under test, the corresponding driving current of the device under test may be acquired in FIG. 5. Subsequently, the power of the device under test during operation may be obtained, by acquiring the product of the voltage difference between the source region and the drain region of the device under test and the driving current, according to the obtained voltage difference between the source region and the drain region of the device under test, and the obtained driving current.

Base on the current-voltage diagram in FIG. 5, the average power of the device under test during the operating period may also be acquired.

Refer to the method of acquiring the power of the device under test, for the method of acquiring the power of the i-th adjacent device, which will not be further described.

The power level of the device under test may represent the level for the magnitude of the average power of the device under test during the operating period. The power level of the device under test may be dimensionless.

The power level $EPD(S_0)$ of the device under test may be acquired according to the power $P_0$ of the device under test. In one embodiment, $EPD(S_0)=b*P_0$. The power of the device under test $P_0$ may also represent the average power of the device under test during the operating time period. The b may be a power coefficient.

The power level of the i-th adjacent device may represent the level for the magnitude of the average power of the i-th adjacent device during the operating period. The power level of the i-th adjacent device may be dimensionless.

The power level $EPD(S_i)$ of the i-th adjacent device may be acquired according to the power $P_i$ of the i-th adjacent device. In one embodiment, $EPD(S_i)=b*P_i$. The power of the i-th adjacent device $P_i$ may also represent the average power of the i-th adjacent device during the operating time period. The b may be a power coefficient.

Figure 6:
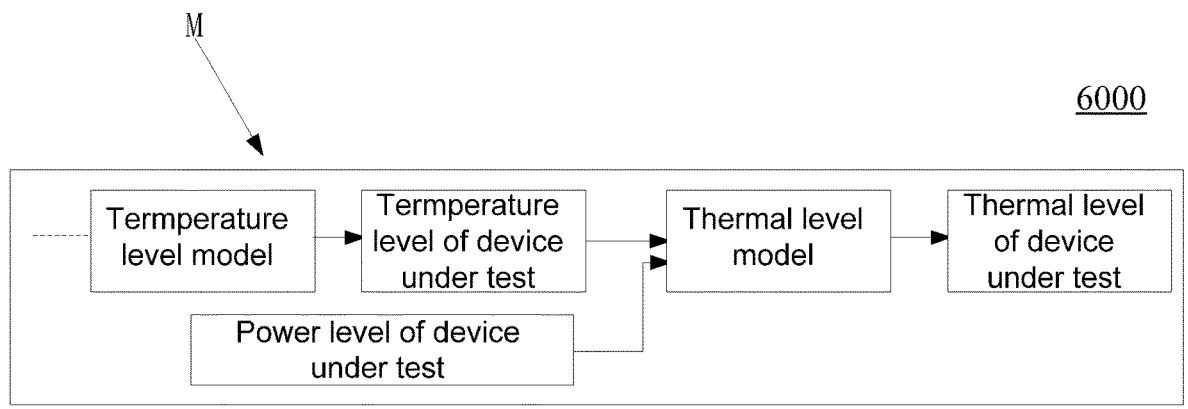
FIG. 6 illustrates a schematic view of an exemplary thermal temperature feedback model consistent with various disclosed embodiments.

Referring to FIG. 6 and FIG. 1, FIG. 6 illustrates a schematic view of an exemplary thermal temperature feedback model M consistent with various disclosed embodiments. The thermal temperature feedback model M may include: a temperature level model for acquiring a temperature level of a device, and a thermal level model for acquiring a thermal level of the device.

The temperature levels of the devices may include the temperature level of the device under test and the temperature levels of the adjacent devices. The thermal levels of the devices may include the thermal level of the device under test and the thermal levels of the adjacent devices.

The thermal level $TML(S_0)$ of the device under test may be acquired through the thermal level model according to the temperature level $WTL(S_0)$ of the device under test and the power level $EPD(S_0)$ of the device under test. In one embodiment, $TML(S_0)=(WTL(S_0)+EPD(S_0))*ETR.$ The temperature level $WTL(S_0)$ of the device under test may be acquired through the temperature level model according to the distance levels between the device under test and the adjacent devices, the thermal levels of the adjacent devices, the vertical thermal diffusion level VHD $(S_0)$ of the device under test, and the ambient temperature level ETS of the device under test and adjacent devices. In one embodiment, $$WTL(S_0) = \sum_{i=1}^{k} W_{i0} * TML(S_i) + VHD(S_0) + ETS.$$

The thermal level $TML(S_i)$ of the i-th adjacent device may be acquired by the thermal level model according to the temperature level $WTL(S_i)$ of the i-th adjacent device and the power level $EPD(S_i)$ of the i-th adjacent device. In one embodiment, $TML(S_i)=(WTL(S_i)+EPD(S_i))*ETR.$ The temperature level $WTL(S_i)$ of the i-th adjacent device may be acquired through the temperature level model according to the distance level $W_{i0}$ between the i-th adjacent device and the device under test, the distance levels between the i-th adjacent device and adjacent devices surrounding the i-th adjacent device, the thermal level $TML(S_0)$ of the device under test, the thermal levels of the adjacent devices surrounding the i-th adjacent device, the vertical thermal diffusion level $VHD(S_i)$ of the i-th adjacent device, and the ambient temperature level ETS of the device under test and the adjacent devices. In one embodiment, $$WTL(S_i) = \sum_{m=1}^{k-1} W_{im(m \neq i)} * TML(S_m) + W_{i0} * TML(S_0) + VHD(S_i) + ETS.$$

ETR may be a thermal coefficient; $W_{i0}$ may represent the distance level between the device under test and the i-th adjacent device; $TML(S_i)$ may represent the thermal level of the i-th adjacent device; k may be equal to the total quantity of the adjacent devices; $W_{im}$ may represent the distance level between the i-th adjacent device and the m-th adjacent device; $TML(S_m)$ may represent the thermal level of the m-th adjacent device.

Figure 7:
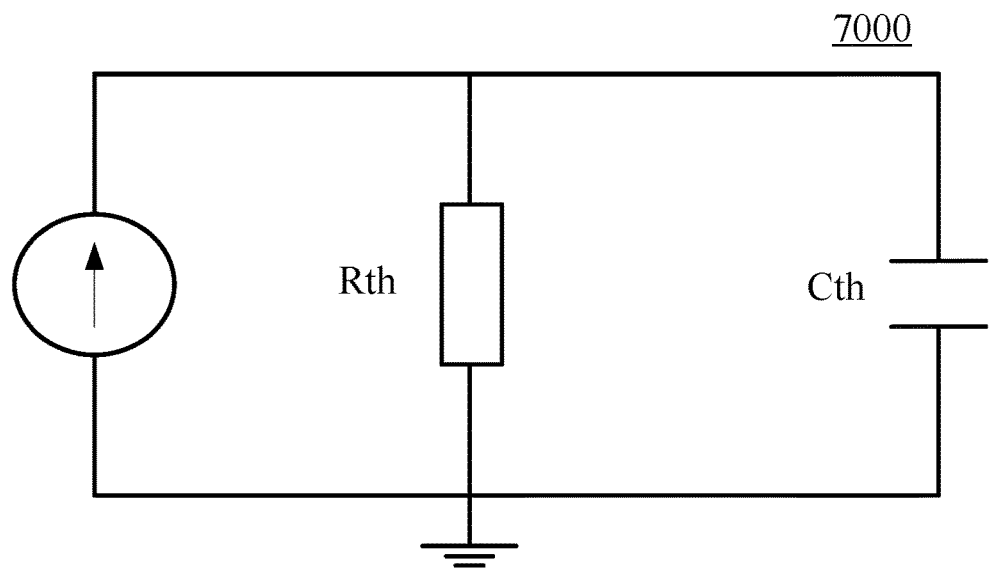
FIG. 7 illustrates a schematic view of an exemplary self-heating heat flow network circuit for simulating an exemplary device heat flow network consistent with various disclosed embodiments.

FIG. 7 illustrates a schematic view of an exemplary self-heating heat flow network circuit for simulating an exemplary device heat flow network consistent with various disclosed embodiments. As shown in FIG. 7, the self-heating heat flow network circuit may include a modified thermal resistance $R_{th}$, and a modified thermal capacity $C_{th}$.

The device under test may have a modified thermal resistance of the device under test and a modified thermal capacity of the device under test. The i-th adjacent device may have a modified thermal resistance of the i-th adjacent device, and a modified thermal capacity of the i-th adjacent device.

It should be noted that, the thermal resistance modification model may further be used to acquire the modified thermal resistance of the i-th adjacent device according to the thermal level of the i-th adjacent device and the reference thermal resistance. The thermal capacity modification model may further be used to acquire the modified thermal capacity of the i-th adjacent device according to the thermal level of the i-th adjacent device and the reference thermal capacity.

The modified thermal resistance $R_{th0}$ of the device under test may be acquired by the thermal resistance modification model according to the thermal level $TML(S_0)$ of the device under test and the reference thermal resistance $R_{th\_base}$. In one embodiment, $$R_{tho}=G_{Ro}(TML(S_0))*R_{th\_base}, \text{ and}$$

$$G_{Ro}(TML(S_0)) = \sum_{n=0}^{q} g_n(TML(S_0))^n.$$

The modified thermal capacity $C_{th0}$ of the device under test may be acquired by the thermal capacity modification model according to the thermal level $TML(S_0)$ of the device under test and the reference thermal capacity $C_{th\_base}$. In one embodiment, $$C_{th0}=G_{co}(TML(S_0))*C_{th\_base}, \text{ and}$$

$$G_{c0}(TML(S_0)) = \sum_{n=0}^{p} f_n(TML(S_0))^n.$$

The modified thermal resistance $R_{thi}$ of the i-th adjacent device may be acquired by the thermal resistance modification model according to the thermal level $TML(S_i)$ of the i-th adjacent device and the reference thermal resistance $R_{th\_base}$. In one embodiment, $$R_{thi}=G_{Ri}(TML(S_i))*R_{th\_base}, \text{ and}$$

$$G_{Ri}(TML(S_i)) = \sum_{n=0}^{q} g_n(TML(S_i))^n.$$

The modified thermal capacity $C_{thi}$ of the i-th adjacent device may be acquired by the thermal capacity modification model according to the thermal level $TML(S_i)$ of the i-th adjacent device and the reference thermal capacity $C_{th\_base}$. In one embodiment, $$C_{thi}=G_{ci}(TML(S_i))*C_{th\_base}, \text{ and}$$

$$G_{ci}(TML(S_i)) = \sum_{n=0}^{p} f_n(TML(S_i))^n.$$

In the equations, p may be greater than or equal to 1, and q may be greater than or equal to 1.

In various embodiments, q may be equal to 2 or 3, satisfying the simulation calculation accuracy for the thermal resistance modification model and reducing the simulation calculation complexity.

In various embodiments, p may be equal to 2 or 3, satisfying the simulation calculation accuracy for the thermal capacity modification model and reducing the simulation calculation complexity.

The method of acquiring the thermal diffusion coefficient, the ambient temperature coefficient, the power coefficient, the thermal coefficient, $f_n$, and $g_n$ in the self-heating effect model may include: testing the total exposed base area of the device under test exposed by the through holes of the device under test, the total exposed base area of the i-th adjacent device exposed by the through holes of the i-th adjacent device, the power of the device under test, the power of the i-th adjacent device, the distances between the adjacent devices, the distances between the device under test and the adjacent devices, the ambient temperature of the device under test and the adjacent devices, the temperature of the device under test, the temperatures of the adjacent devices, the time constant of the device under test, and the time constants of the adjacent devices; acquiring the difference between the temperature of the device under test and the ambient temperature of the device under test and the adjacent devices, according to the ambient temperature of the device under test and the adjacent devices and the temperature of the device under test; acquiring the difference between the temperature of each adjacent device and the ambient temperature of the device under test and the adjacent devices, according to the ambient temperature of the device under test and the adjacent devices, and the temperature of each adjacent device; obtaining the test values of $R_{th0}$, $R_{thi}$, and $R_{thm}$ by calculation according to formula $PR_{th}=\Delta T$; obtaining the test values of $C_{th0}$, $C_{thi}$, and $C_{thm}$ by calculation according to formula $R_{th}*C_{th}=T_{con}$, where $T_{con}$ is a time constant; setting test conductions, and performing tests under different test conditions to obtain corresponding test data, performing simulation calculation by plugging the obtained test data into the self-heating effect model, to obtain the values of the thermal diffusion coefficient, the ambient temperature coefficient, the power coefficient, the thermal coefficient, $f_n$, and $g_n$.

In various embodiments, the method of setting the test conditions may include: setting a first type of test conditions, setting a second type of test conditions, setting a third type of test conditions, and setting a fourth type of test conditions.

The method of setting the first type of test conditions may include: designing such that: the total exposed base area of the device under test exposed by the through holes of the device under test has different values, and other parameters of the device under test remain the same; and when the total exposed base area of the device under test exposed by the through holes of the device under test has different values, the power of the device under test remains the same, the powers of the adjacent devices remain the same, the total exposed base area of the i-th adjacent device exposed by the through holes of the i-th adjacent device remains the same, the distances between the adjacent devices remain the same, and the distances between the device under test and the adjacent devices remain the same.

The method of setting the second type of test conditions may include: designing such that: the device under test operates at different operating powers, and other conditions of the device under test remain the same; and when the device under test operates at different operating powers, the powers of the adjacent devices remain the same, the total exposed base area of the device under test exposed by the through holes of the device under test remains the same, the total exposed base area of the i-th adjacent device exposed by the through holes of the i-th adjacent device remains the same, the distances between the adjacent devices remain the same, and the distances between the device under test and the adjacent devices remain the same.

The method of setting the third type of test conditions may include: designing such that: the total exposed base area of the i-th adjacent device exposed by the through holes of the i-th adjacent device has different values, and the other parameters of the i-th adjacent device remain the same; and when the total exposed base area of the i-th adjacent device exposed by the through holes of the i-th adjacent device has different values, the total exposed base area of the m-th adjacent device exposed by the through holes of the m-th adjacent device remains the same, the total exposed base area of the device under test exposed by the through holes of the device under test remains the same, the power of the device under test remains the same, the power of the i-th adjacent device remains the same, the power of the m-th adjacent device remains the same, the distances between the adjacent devices remain the same, the distances between the device under test and the adjacent devices remain the same.

The method of setting the fourth type of test conditions may include: designing such that: the i-th adjacent device operates at different operating powers, and other conditions of the i-th adjacent device remain the same; and when the i-th adjacent device operates at different operating powers, the total exposed base area of the device under test exposed by the through holes of the device under test remains the same, the total exposed base area of the i-th adjacent device exposed by the through holes of the i-th adjacent device remains the same, the total exposed base area of the m-th adjacent device exposed by the through holes of the m-th adjacent device remains the same, the power of the m-th adjacent device remains the same, the power of the device under test remains the same, the distances between the adjacent devices remain the same, the distances between the device under test and the adjacent devices remain the same.

Figure 8:
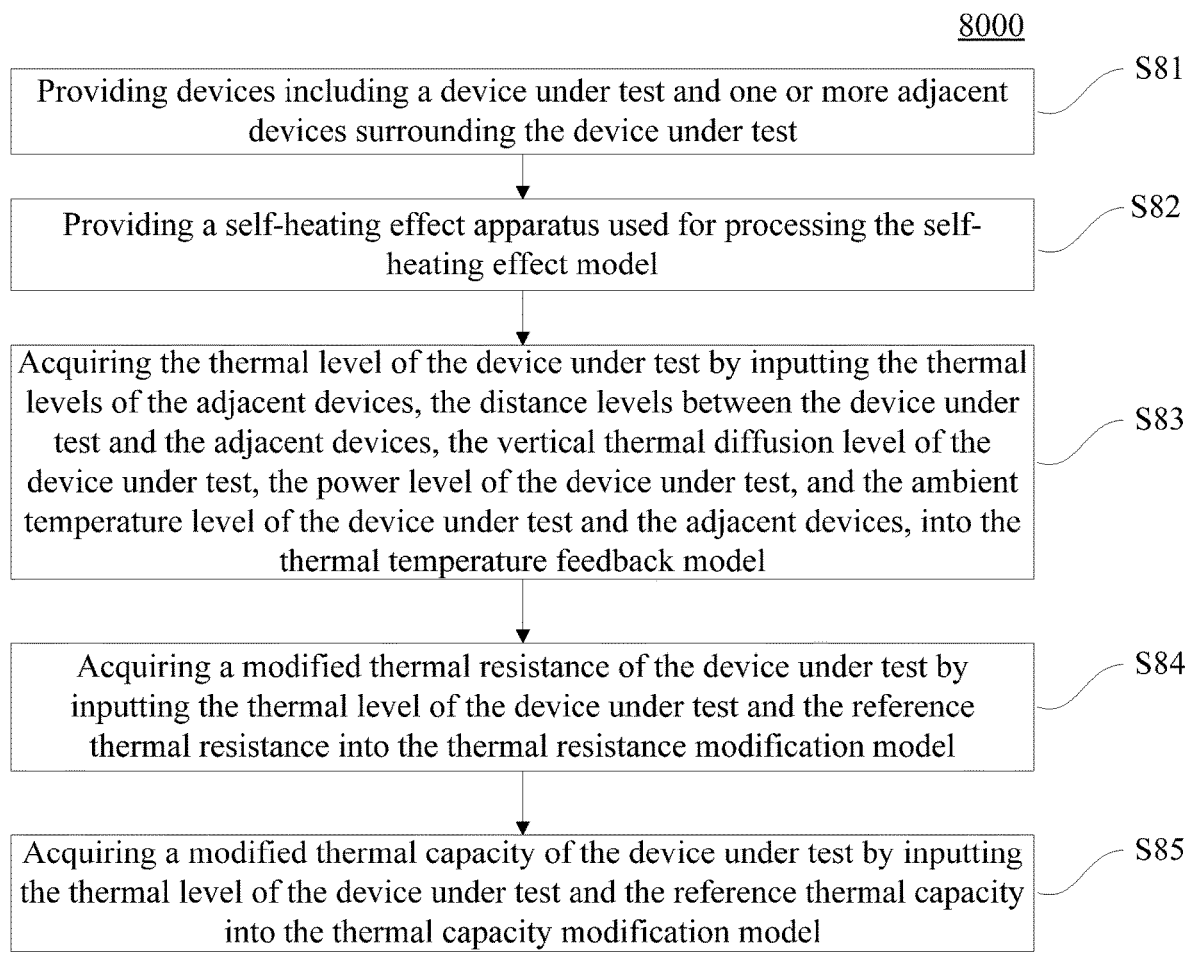
FIG. 8 illustrates a flow chart of an exemplary test method consistent with various disclosed embodiments.

Accordingly, various embodiments further provide a test method. FIG. 8 illustrates a flow chart of an exemplary test method consistent with various disclosed embodiments. As shown in FIG. 8, the test method may include: at S81, providing devices including a device under test and one or more adjacent devices surrounding the device under test; at S82, providing a self-heating effect apparatus used for processing the self-heating effect model; at S83, acquiring the thermal level of the device under test by inputting the thermal levels of the adjacent devices, the distance levels between the device under test and the adjacent devices, the vertical thermal diffusion level of the device under test, the power level of the device under test, and the ambient temperature level of the device under test and the adjacent devices, into the thermal temperature feedback model; at S84, acquiring a modified thermal resistance of the device under test by inputting the thermal level of the device under test and the reference thermal resistance into the thermal resistance modification model; and, at S85, acquiring a modified thermal capacity of the device under test by inputting the thermal level of the device under test and the reference thermal capacity into the thermal capacity modification model.

In the disclosed test method, the self-heating effect of the device under test may be tested by adopting the self-heating effect model, such that the heat flow network of the device under test may be accurately acquired.

Figure 9:
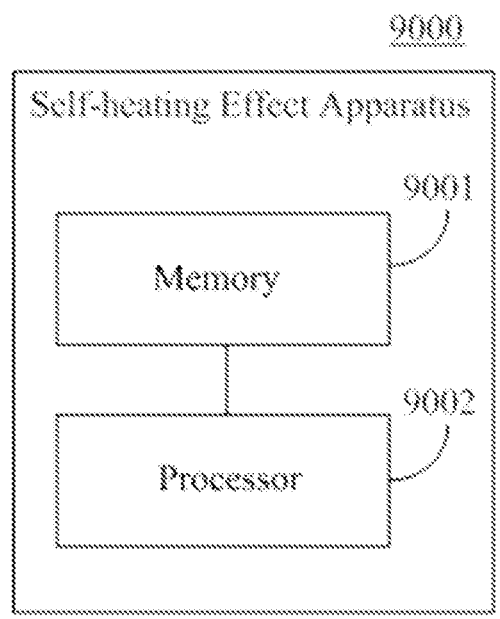
FIG. 9 is a schematic diagram of an exemplary self-heating effect apparatus used for processing a self-heating effect model according to various embodiments of the present disclosure.

Various embodiments of the present disclosure further provide a self-heating effect apparatus used for processing the disclosed self-heating effect model. FIG. 9 is a schematic diagram of an exemplary self-heating effect apparatus used for processing a self-heating effect model according to various embodiments of the present disclosure.

As shown in FIG. 9, the self-heating effect apparatus 9000 includes a memory 9001 and a processor 9002. More devices/components may be added. The memory 9001 is configured to store program instructions for a self-heating effect model. The processor 9002 is coupled to the memory 9001, and is configured to execute the program instructions and process the disclosed self-heating effect model.

In some embodiments, computer-executable program instructions may be stored in the memory 9001 and executed by the processor 9002 for processing the disclosed self-heating effect model. In other embodiments, a non-transitory computer-readable storage medium may further be included to contain computer-executable program instructions, which may be executed by the processor 9002 for processing the disclosed self-heating effect model. Detail descriptions related to the self-heating effect model are not repeated here.

In various embodiments, the exemplary self-heating effect apparatus 9000 may further include a communications interface configured to obtain information and data for the processor 9002 to process the disclosed self-heating effect model.

The present disclosure provides a self-heating effect model and a test method. The self-heating effect model may be used to characterize a heat flow network of devices which include a device under test and one or more adjacent devices surrounding the device under test. The self-heating effect model may include: a reference thermal resistance and a reference thermal capacity; a thermal temperature feedback model for acquiring the thermal level of the device under test by the thermal levels of the adjacent devices, the distance levels between the device under test and the adjacent devices, the vertical thermal diffusion level of the device under test, the power level of the device under test, and the ambient temperature level of the device under test and the adjacent devices; a thermal resistance modification model used to acquire the modified thermal resistance of the device under test according to the thermal level of the device under test and the reference thermal resistance; a thermal capacity modification model used to acquire the modified thermal capacity of the device under test according to the thermal level of the device under test and the reference thermal capacity. The self-heating effect model may accurately characterize the heat flow network of the device under test.

In comparison with the existing technology, the present disclosure provides the technical solutions having the following features.

The disclosed self-heating effect model may include a thermal temperature feedback model, a thermal resistance modification model and a thermal capacity modification model. The thermal temperature feedback model may take into account the influences on the thermal level of the device under test by the distance levels between the device under test and the adjacent devices, the thermal levels of the adjacent devices, the vertical thermal diffusion level of the device under test, the power level of the device under test, and the ambient temperature level of the device under test and the adjacent devices. Accordingly, the thermal temperature feedback model may accurately characterize the device thermal level.

The thermal resistance modification model may be used to acquire the modified thermal resistance according to the thermal level of the device under test and the reference thermal resistance. The thermal capacity modification model may be used to acquire the modified thermal capacity of the device under test according to the thermal level of the device under test and the reference thermal capacity. Because of the accurate characterization of the device thermal level, the thermal resistance modification model may accurately characterize the modified thermal resistance of the device under test, and the thermal capacity modification model may accurately characterize the modified thermal capacity of the device under test. Thus, the self-heating effect model may accurately characterize the heat flow network of the device under test.

In the disclosed test method, the self-heating effect of the device under test may be tested by the self-heating effect model, such that the heat flow network of the device under test may be accurately acquired.

It is apparent that the described embodiments are some but not all of the embodiments of the present invention. The present invention is not limited to the described embodiments. Based on the disclosed embodiments, persons of ordinary skill in the art may make various changes and modifications consistent with the present disclosure, all of which are within the spirit and scope of the present invention. Further, in the present disclosure, the disclosed embodiments and the features of the disclosed embodiments may be combined under conditions without conflicts. The scope of the present disclosure is defined by the scope of the claims.

What is claimed is:

1. A self-heating effect apparatus comprising:
   a memory, storing program instructions for a self-heating effect model, and
   a processor, coupled to the memory and, when executing the program instructions, configured to process the self-heating effect model for characterizing a heat flow network of devices, the devices including a device under test and one or more adjacent devices surrounding the device under test, wherein the self-heating effect model includes:
   a thermal temperature feedback model, used to acquire a thermal level of the device under test, by thermal levels of the one or more adjacent devices, distance levels between the device under test and the one or more adjacent devices, a vertical thermal diffusion level of the device under test, a power level of the device under test, and an ambient temperature level of the device under test and the one or more adjacent devices;
   a thermal resistance modification model, used to acquire a modified thermal resistance of the device under test according to the thermal level of the device under test and a reference thermal resistance; and
   a thermal capacity modification model, used to acquire a modified thermal capacity of the device under test according to the thermal level of the device under test and a reference thermal capacity.

2. The apparatus according to claim 1, wherein:
   the thermal temperature feedback model comprises: a temperature level model for acquiring a temperature level of a device; and a thermal level model for acquiring a thermal level of the device.

3. The apparatus according to claim 2, wherein:
   temperature levels of the devices include a temperature level of the device under test and temperature levels of the one or more adjacent devices; and
   thermal levels of the devices include a thermal level of the device under test and thermal levels of the one or more adjacent devices.

4. The apparatus according to claim 3, wherein:
   the thermal level of the device under test is denoted as $TML(S_0)$ and acquired by the thermal level model, according to the temperature level, denoted as $WTL(S_0)$, of the device under test and the power level, denoted as $EPD(S_0)$, of the device under test, $TML(S_0)=(WTL(S_0)+EPD(S_0))*ETR$, wherein ETR is a thermal coefficient; and
   the temperature level, denoted as $WTL(S_0)$, of the device under test is acquired by the temperature level model, according to the distance levels between the device under test and the one or more adjacent devices, the thermal levels of the one or more adjacent devices, the vertical thermal diffusion level, denoted as $VHD(S_0)$, of the device under test, and the ambient temperature level, denoted as ETS, of the device under test and the one or more adjacent devices $$WTL(S_0) = \sum_{i=1}^{k} W_{i0} * TML(S_i) + VHD(S_0) + ETS,$$

wherein:
   $W_{i0}$ represents a distance level between the device under test and an i-th adjacent device;
   $TML(S_i)$ represents the thermal level of the i-th adjacent device; and
   k equals to a total quantity of the one or more adjacent devices.

5. The apparatus according to claim 4, wherein:
   the thermal level, denoted as $TML(S_i)$, of the i-th adjacent device is acquired by the thermal level model, according to the temperature level, denoted as $WTL(S_i)$, of the i-th adjacent device and the power level, denoted as $EPD(S_i)$, of the i-th adjacent device, $TML(S_i)=(WTL(S_i)+EPD(S_i))*ETR$; and
   the temperature level, denoted as $WTL(S_i)$, of the i-th adjacent device is acquired by the temperature level model, according to the distance level, denoted as $W_{i0}$, between the i-th adjacent device and the device under test, distance levels between the i-th adjacent device and adjacent devices surrounding the i-th adjacent device, the thermal level, denoted as $TML(S_0)$, of the device under test, thermal levels of the adjacent devices surrounding the i-th adjacent device, the vertical thermal diffusion level, denoted as $VHD(S_i)$, of the i-th adjacent device, and the ambient temperature, denoted as ETS, of the device under test and the one or more adjacent devices, $$WTL(S_i) = \sum_{m=1}^{k-1} W_{im(m \ne i)} * TML(S_m) + W_{i0} * TML(S_0) + VHD(S_i) + ETS,$$

wherein:
   $W_{im}$ represents the distance level between the i-th adjacent device and an m-th adjacent device; and
   $TML(S_m)$ represents the thermal level of the m-th adjacent device.

6. The apparatus according to claim 5, wherein:
   the distance level, denoted as $W_{im}$, between the i-th adjacent device and the m-th adjacent device is acquired according to a distance, denoted as $L_{im}$, between the i-th adjacent device and the m-th adjacent device, $W_{im}=1/L_{im}$.

7. The apparatus according to claim 5, wherein:
the distance level, denoted as $W_{im}$, between the i-th adjacent device and the m-th adjacent device is acquired according to a distance, denoted as $L_{im}$, between the i-th adjacent device and the m-th adjacent device, $W_{im}=1/L_{im}^2$.

8. The apparatus according to claim 5, wherein:
the i-th adjacent device includes a base of the i-th adjacent device, and one or more through holes of the i-th adjacent device are formed above a surface of the base of the i-th adjacent device; and
the vertical thermal diffusion level, denoted as $VHD(S_i)$, of the i-th adjacent device is acquired according to a total exposed area, denoted as $A_i$, of the base of the i-th adjacent device exposed by the one or more through holes of the i-th adjacent device, $$VHD(S_i) = \sum_{n=0}^{l} a_n A_i^n,$$

wherein l is greater than or equals to 1, and $a_n$ is a thermal diffusion coefficient.

9. The apparatus according to claim 5, wherein:
the power level, denoted as $EPD(S_i)$, of the i-th adjacent device is acquired according to a power, denoted as $P_i$, of the i-th adjacent device, $EPD(S_i)=b*P_i$, wherein b is a power coefficient.

10. The apparatus according to claim 5, wherein:
the thermal resistance modification model is further used to acquire a modified thermal resistance of the i-th adjacent device according to the thermal level of the i-th adjacent device and the reference thermal resistance; and
the thermal capacity modification model is further used to acquire a modified thermal capacity of the i-th adjacent device according to the thermal level of the i-th adjacent device and the reference thermal capacity.

11. The apparatus according to claim 10, wherein:
the modified thermal resistance, denoted as $R_{thi}$, of the i-th adjacent device is acquired by the thermal resistance modification model according to the thermal level, denoted as $TML(S_i)$, of the i-th adjacent device, and the reference thermal resistance, denoted as $R_{th\_base}$, $R_{thi}=G_{Ri}(TML(S_i))*R_{th\_base}$, and $$G_{Ri}(TML(S_i)) = \sum_{n=0}^{q} g_n (TML(S_i))^n,$$

wherein q is greater than or equal to 1, and $g_n$ is a thermal level coefficient for the thermal resistance modification model; and
the modified thermal capacity, denoted as $C_{thi}$, of the i-th adjacent device is acquired by the thermal capacity modification model according to the thermal level, denoted as $TML(S_i)$, of the i-th adjacent device and the reference thermal capacity $C_{th\_base}$, $C_{thi}=G_{ci}(TML(S_i))*C_{th\_base}$, and $$G_{ci}(TML(S_i)) = \sum_{n=0}^{p} f_n (TML(S_i))^n,$$

wherein p is greater than or equal to 1, and $f_n$ is a thermal level coefficient for the thermal capacity modification model.

12. The apparatus according to claim 11, wherein:
q is equal to 2 or 3; and
p is equal to 2 or 3.

13. The apparatus according to claim 1, wherein:
the modified thermal resistance, denoted as $R_{th0}$, of the device under test is acquired by the thermal resistance modification model according to the thermal level, denoted as $TML(S_0)$, of the device under test and the reference thermal resistance, denoted as $R_{th\_base}$, $R_{th0}=G_{Ro}(TML(S_0))*R_{th\_base}$, and $$G_{Ro}(TML(S_0)) = \sum_{n=0}^{q} g_n (TML(S_0))^n,$$

wherein q is greater than or equal to 1, and $g_n$ is a thermal level coefficient for the thermal resistance modification model; and
the modified thermal capacity, denoted as $C_{th0}$, of the device under test is acquired by the thermal capacity modification model according to the thermal level, denoted as $TML(S_0)$, of the device under test and the reference thermal capacity $C_{th\_base}$, $C_{th0}=G_{co}(TML(S_0))*C_{th\_base}$, and $$G_{c0}(TML(S_0)) = \sum_{n=0}^{p} f_n (TML(S_0))^n,$$

wherein p is greater than or equal to 1, and $f_n$ is a thermal level coefficient for the thermal capacity modification model.

14. The apparatus according to claim 13, wherein:
q is equal to 2 or 3; and
p is equal to 2 or 3.

15. The apparatus according to claim 1, wherein:
a distance level, denoted as $W_{i0}$, between the device under test and an i-th adjacent device is acquired according to a distance, denoted as $L_{i0}$, between the device under test and the i-th adjacent device, $W_{i0}=1/L_{i0}.$ 16. The apparatus according to claim 1, wherein:
a distance level, denoted as $W_{i0}$, between the device under test and an i-th adjacent device is acquired according to a distance, denoted as $L_{i0}$, between the device under test and the i-th adjacent device, $W_{i0}=1/L_{i0}^2.$ 17. The apparatus according to claim 1, wherein:
the power level, denoted as $EPD(S_0)$, of the device under test is acquired according to a power, denoted as $P_0$, of the device under test, $EPD(S_0)=b*P_0$, wherein b is a power coefficient.

18. The apparatus according to claim 1, wherein:
the ambient temperature level, denoted as ETS, of the device under test and the one or more adjacent devices is acquired according to an ambient temperature, denoted as $T_s$, of the device under test and the one or more adjacent devices, $ETS=tT_s$.

19. A self-heating effect apparatus comprising:
a memory, storing program instructions for a self-heating effect model, and
a processor, coupled to the memory and, when executing the program instructions, configured to process the self-heating effect model for characterizing a heat flow network of devices, the devices including a device under test and one or more adjacent devices surrounding the device under test, wherein the self-heating effect model includes:
a thermal temperature feedback model, used to acquire a thermal level of the device under test, by thermal levels of the one or more adjacent devices, distance levels between the device under test and the one or more adjacent devices, a vertical thermal diffusion level of the device under test, a power level of the device under test, and an ambient temperature level of the device under test and the one or more adjacent devices;
a thermal resistance modification model, used to acquire a modified thermal resistance of the device under test according to the thermal level of the device under test and a reference thermal resistance; and
a thermal capacity modification model, used to acquire a modified thermal capacity of the device under test according to the thermal level of the device under test and a reference thermal capacity, wherein:
the device under test includes a base of the device under test, and one or more through holes of the device under test are formed above a surface of the base of the device under test; and
the vertical thermal diffusion level, denoted as $VHD(S_0)$, of the device under test is acquired according to a total exposed area, denoted as $A_0$, of the base of the device under test exposed by the one or more through holes of the device under test, $$VHD(S_0) = \sum_{n=0}^{l} a_n A_0^n,$$

wherein $a_n$ is a thermal diffusion coefficient, and wherein l is greater than or equal to 1.

20. A test method, comprising:
providing devices including a device under test and one or more adjacent devices surrounding the device under test;
providing a self-heating effect apparatus including:
a memory, storing program instructions for a self-heating effect model, and
a processor, coupled to the memory and, when executing the program instructions, configured to process the self-heating effect model for characterizing a heat flow network of devices, the devices including a device under test and one or more adjacent devices surrounding the device under test, wherein the self-heating effect model includes:
a thermal temperature feedback model, used to acquire a thermal level of the device under test, by thermal levels of the one or more adjacent devices, distance levels between the device under test and the one or more adjacent devices, a vertical thermal diffusion level of the device under test, a power level of the device under test, and an ambient temperature level of the device under test and the one or more adjacent devices,
a thermal resistance modification model, used to acquire a modified thermal resistance of the device under test according to the thermal level of the device under test and a reference thermal resistance, and
a thermal capacity modification model, used to acquire a modified thermal capacity of the device under test according to the thermal level of the device under test and a reference thermal capacity;
acquiring a thermal level of the device under test, by inputting the thermal levels of the one or more adjacent devices, the distance levels between the device under test and the one or more adjacent devices, the vertical thermal diffusion level of the device under test, the power level of the device under test, and the ambient temperature level of the device under test and the one or more adjacent devices, into the thermal temperature feedback model;
acquiring the modified thermal resistance of the device under test by inputting the thermal level of the device under test and the reference thermal resistance into the thermal resistance modification model; and
acquiring the modified thermal capacity of the device under test by inputting the thermal level of the device under test and the reference thermal capacity into the thermal capacity modification model.

\* \* \* \* \*